Patented Sept. 26, 1950

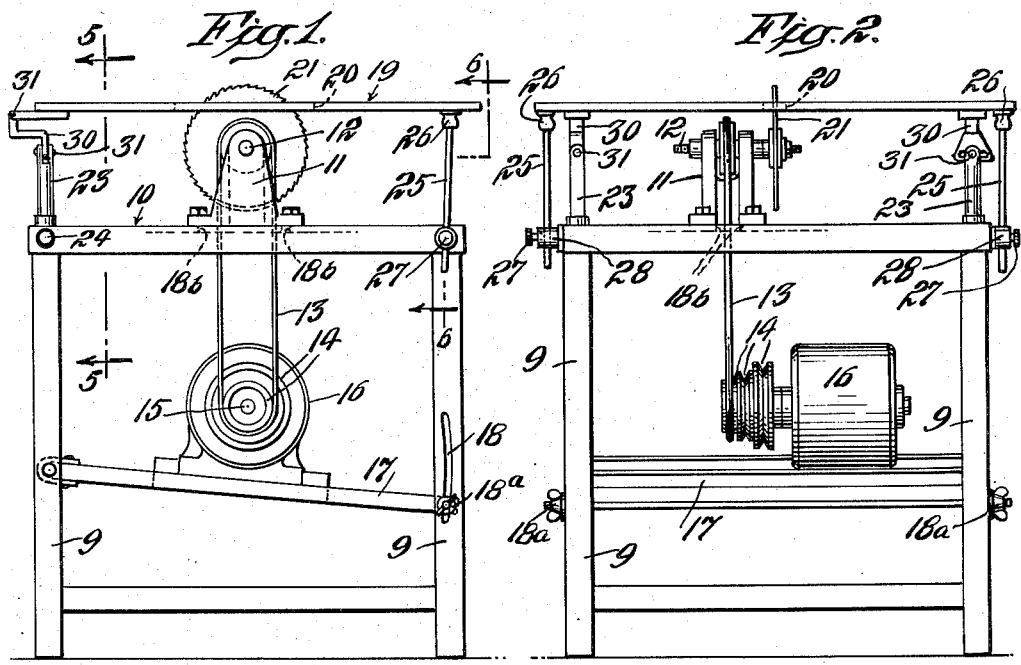

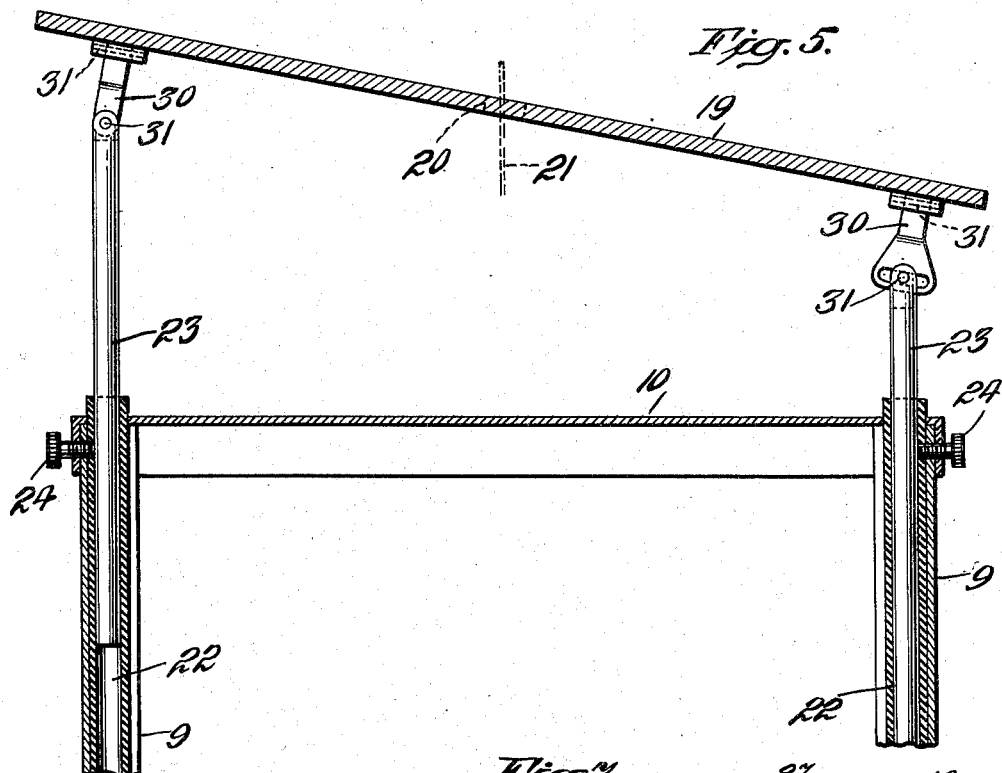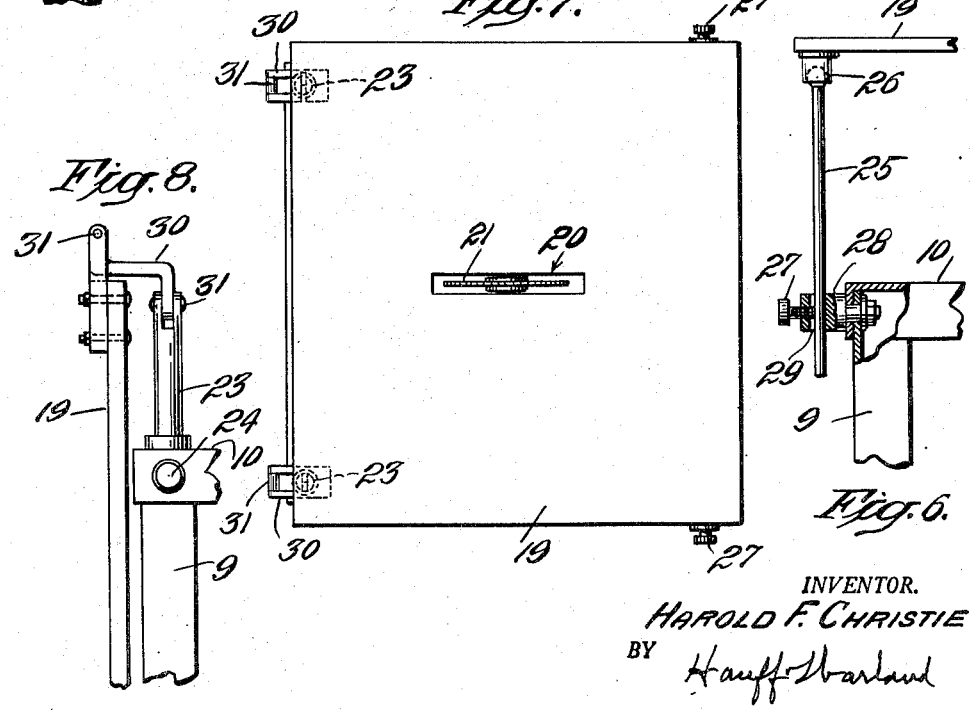

2,523,680

UNITED STATES PATENT OFFICE 2,523,680

ADJUSTABLE SUPPLEMENTAL TABLE TOP FOR POWER-DRIVEN TOOLS

Harold F. Christie, Caldwell, N. J.

Application January 12, 1946, Serial No. 640,891

1 Claim. (Cl. 143—132)

My invention consists of a new and improved portable power driven tool. It is shown as applied to a circular saw but the construction is such that it may drive an emory wheel, sander, buffer or any other desired tool.

The object of the invention is to provide a light portable, power driven tool which may be conveniently carried from one part of a room to another or may be transported to any desired location.

A further object of the invention is to construct a light portable power driven device capable of adjustment to various speeds by means of a motor adjustably secured to the frame.

The invention consists essentially of a table to the top of which is attached an arbor supporting a shaft which is driven by a motor secured to an adjustable frame beneath the top of the table; and a supplementary top or work table which is adjustably secured to the main table and the supplementary table contains an opening through which a circular saw blade extends. The supplementary table may be adjusted to permit an angular or beveled cut of the material to be sawed and to permit adjustment of a cutting surface of a saw blade, and may be thrown back out of the way when the device is used for purposes other than sawing.

Although the novel features which are believed to be characteristic of this invention will be more particularly pointed out in the claim appended hereto, the invention itself may be better understood by referring to the following description taken with the accompanying drawing in which a particular embodiment of the invention has been set forth for purposes of illustration.

In the accompanying drawings:

Fig. 1 is a side elevation of the device.

Fig. 2 is a front elevation.

Fig. 3 is a side elevation of a table showing the different sizes of the motor adjustment to vary the speeds.

Fig. 4 is a sectional view taken on line 4—4 of Fig. 3.

Fig. 5 is a sectional view taken on the line 5—5 of Fig. 1.

Fig. 6 is a sectional view taken on the line 6—6 of Fig. 1.

Fig. 7 is a plan view of the entire device.

Fig. 8 is a fragmentary view of the device shown with the table out of the way.

The device is preferably of rectangular construction in the form of a table having uprights 9 and a top 10. On the table top 10 is secured an arbor 11 carrying a shaft 12 driven by a belt 13 passing over varying size pulleys 14 formed on a shaft 15 extending from a motor 16.

The motor 16 is mounted on a shelf 17. This shelf 17 is secured by a hinge to the rear uprights 9 (Fig. 1) and may be raised or lowered by projections extending into slots 18 in the front uprights 9 and secured thereto by set screws 18a in order to provide different speeds of rotation of the shaft 12. There is an opening 18b shown in dotted lines in Figs. 1 and 3 through which the belt passes. The motor may also be adjusted horizontally to permit the belt to be in a vertical position at all times in any well known manner, not shown.

When a sanding, emory, buffer, or other desired tool is secured to the power driven shaft 12 it is unnecessary to have anything other than the arbor and the power driven shaft 12 appear above the top of the table 10. However, when the device is used for sawing purposes there is adjustably and slidably secured to the table top 10 a supplementary or work table 19. This supplementary table may be raised or lowered to permit desired amounts of the saw blade to extend therethrough. The table 19 has an opening 20 shown in Fig. 7 through which the saw 21 extends. This opening 20 is of sufficient size to allow the supplementary table 19 to be placed at different angles as shown in Figs. 3 and 5 in order to provide for an angular or beveled cut of the wood cut at such an angle as required.

In order to provide for the raising or lowering of the supplementary table 19 and in order to provide for its being placed at an angle and also to have it entirely out of the way so it will not interfere with the grinding or buffing function, it may be thrown completely back of the main table or frame, as shown in Fig. 8, or it might be completely lifted off the frame when the device is used for buffing etc., and put back again when the sawing operation is performed. As the removal and replacements, however, would take time to adjust, it is therefore preferable to have the supplemental table swung entirely backward.

In order to accomplish this result the two rear uprights 9 have an opening or recess 22 shown in Fig. 5. In this opening 22 is placed an upright 23 which may be secured at any desired height by set screws 24. The front of the frame as shown in Fig. 2, has secured at each corner thereof an upright 25. This is secured to the upper end of the supplementary table 19 by a swivel joint 26. The uprights 25 may be secured at any desired height by means of a set screw 27 operating in a short arm 28 having an opening 29 of sufficient width to compensate for the angle and allowing a certain amount of play when the supplementary table is placed at an angle. The supplementary table 19 can be completely thrown back to the rear of the main frame as shown in Fig. 8 by means of a hinge, formed as shown at numeral 30 and pivoted as shown in numeral 31 to the upright 23.

I claim:

A convertible power driven tool comprising a table, an arbor mounted upon said table carrying a drive shaft for supporting a circular saw, power means for rotating the drive shaft, supporting means at opposite ends of the table, a supplemental top mounted on the supporting means in spaced relation to the table having an opening for the circular saw, the supporting means being adjustable for varying the elevation and inclination of the top and the depth and angularity of cut of the saw, the upper portion of the supporting means at one end of the table being offset, the supplemental top being hinged at one end to the offset supporting means and of such a length as to be swung entirely away from the arbor and into an essentially vertical position at the side of the table to render the arbor free for buffing operations and the like.

HAROLD F. CHRISTIE.

REFERENCES CITED

The following references are of record in the file of this patent:

UNITED STATES PATENTS

| Number | Name | Date |
|---|---|---|
| 1,380,707 | Fehrm | June 7, 1921 |
| 1,387,869 | Royle | Aug. 16, 1921 |
| 1,584,028 | Gottschalk | May 11, 1926 |
| 1,669,941 | Kennedy | May 15, 1928 |
| 1,756,527 | Thompson | Apr. 29, 1930 |
| 1,793,392 | Francyk | Feb. 17, 1931 |
| 1,982,254 | Juengling | Nov. 27, 1934 |
| 2,012,576 | Montgomery | Aug. 27, 1935 |
| 2,080,475 | Hedgpeth | May 18, 1937 |